United States Patent
Kindt

(10) Patent No.: US 12,326,529 B2
(45) Date of Patent: Jun. 10, 2025

(54) ENERGY-RESOLVING PHOTON COUNTING DETECTOR PIXEL

(71) Applicant: Teledyne Dalsa B.V., Eindhoven (NL)

(72) Inventor: Willem Johannes Kindt, Eindhoven (NL)

(73) Assignee: TELEDYNE DALSA B.V., Eindhoven (NL)

( * ) Notice: Subject to any disclaimer, the term of this patent is extended or adjusted under 35 U.S.C. 154(b) by 206 days.

(21) Appl. No.: 18/183,390

(22) Filed: Mar. 14, 2023

(65) Prior Publication Data
US 2023/0296796 A1    Sep. 21, 2023

(30) Foreign Application Priority Data

Mar. 15, 2022    (EP) ..................................... 22162331

(51) Int. Cl.
  *G01T 1/24* (2006.01)
  *G01T 1/17* (2006.01)
  *G01T 1/20* (2006.01)
  *G01T 1/29* (2006.01)

(52) U.S. Cl.
  CPC .............. *G01T 1/247* (2013.01); *G01T 1/171* (2013.01); *G01T 1/2928* (2013.01); *G01T 1/2018* (2013.01)

(58) Field of Classification Search
  CPC ....... G01T 1/247; G01T 1/171; G01T 1/2928; G01T 1/2018; G01T 1/17; H04N 25/773
  See application file for complete search history.

(56) References Cited

U.S. PATENT DOCUMENTS

| | | | |
|---|---|---|---|
| 2010/0141499 A1* | 6/2010 | Mathe | H03M 1/462 341/172 |
| 2015/0265238 A1* | 9/2015 | Proksa | A61B 6/4035 378/62 |
| 2019/0170880 A1* | 6/2019 | Steadman Booker | G01T 1/17 |
| 2020/0064500 A1* | 2/2020 | Steadman Booker | H03K 5/1532 |
| 2021/0227154 A1* | 7/2021 | Muto | H04N 23/30 |

FOREIGN PATENT DOCUMENTS

| | | | | |
|---|---|---|---|---|
| EP | 3385756 | | 10/2018 | |
| GB | 2101435 A | * | 1/1983 | ............. H03M 1/48 |
| WO | 2014057400 | | 4/2014 | |

* cited by examiner

*Primary Examiner* — Edwin C Gunberg
*Assistant Examiner* — Richard O Toohey
(74) *Attorney, Agent, or Firm* — MH2 Technology Law Group, LLP

(57) ABSTRACT

Aspects of the present disclosure relate to an energy-resolving photon counting detector pixel. Further aspects of the present disclosure relate to an energy-resolving photon counting detector comprising a plurality of such pixels, and to an energy-resolving photon counting system comprising the same.
In accordance with an aspect of the present disclosure, a CSA base level shift detector is used for determining a shift in the CSA base level over time relative to a first level. The pixel is configured to reset the CSA in dependence of the determined CSA base level shift.

20 Claims, 12 Drawing Sheets

ENERGY-RESOLVING PHOTON COUNTING DETECTOR PIXEL

FIELD

Aspects of the present disclosure relate to an energy-resolving photon counting detector pixel. Further aspects of the present disclosure relate to an energy-resolving photon counting detector comprising a plurality of such pixels, and to an energy-resolving photon counting system comprising the same. Aspects of the present disclosure particularly relate to an energy-resolving photon counting detector pixel, detector, or system to be used in X-ray imaging.

BACKGROUND

Photon counting detectors capable of discriminating X-ray photon energies are known in the art. Compared to energy-integrating X-ray detectors working in a continuous mode, energy-resolving photon counting detectors are operated in a pulse mode. These detectors are capable of processing and registering the separate absorption events when an X-ray is absorbed by the detector material. Because photons are counted individually, energy-resolving photon counting detectors have the potential to offer superior noise characteristics when compared to energy-integrating detectors. This makes them attractive candidates to be used in computed tomography, CT, applications. For example, using energy-resolving photon counting detectors, contrast agents can be identified much better during a CT scan.

An energy-resolving photon counting detector comprises a plurality of detector pixels that are arranged in a matrix of rows and columns. A schematic example of a known detector pixel for an energy-resolving photon counting detector is shown in FIG. 1. In this figure, pixel 1 comprises a photoconductor 2 for example be in the form of a photodiode. Alternatively, photoconductor 2 can comprise a piece of photo-absorbing material, such as Cadmium Telluride, arranged in between electrodes. This latter case is shown in FIG. 1, wherein a first electrode is negatively biased using a voltage source 3 and wherein a second electrode is connected to a signal processing unit 4. Photoconductor 2 outputs a photocurrent as a result of absorbing a photon. This current comprises or is formed by free electrons that are generated by the photon absorption and that are repelled towards the second electrode by the large negative bias being present on the first electrode.

Signal processing unit 4 processes the inputted photocurrent and outputs the processed signal, the amplitude of which represents the energy of the incident photon. The processed signal is outputted to a plurality of comparators 5A, 5B that compare the processed signal with respective thresholds. The outputs of comparators 5A, 5B, which together form a thermometer code, are connected to respective counters 6A, 6B. After processing many incident photons, the energy spectrum of the incident radiation can be determined by the values stored in counters 6A, 6B. More in particular, counters 6A, 6B comprise the sum of the thermometer codes that have been outputted by comparators 5A, 5B during a predetermined amount of time.

Assuming that the first mentioned number corresponds to the highest threshold value, a collection of counter values of 0, 1, 1, 1 would indicate, for a system comprising four comparators, that a single photon was received of which the energy exceeded that associated with the first to third thresholds. Similarly, a collection of counter values of 0, 1, 2, 2 would indicate for such system that two photons were received, i.e. one photon having an energy exceeding that associated with the first to third thresholds, and one photon having an energy exceeding that associated with the first and second thresholds. Accordingly, the number of photons received as well as the energy of these photons can be determined using the values stored in the counters.

In the example above, four photon energy bins can be defined. A first photon energy bin corresponds to photons having an energy that would cause the first threshold to be exceeded but not the second threshold, a second photon energy bin corresponds to photons having an energy that would cause the first and second thresholds to be exceeded but not the third threshold, a third photon energy bin corresponds to photons having an energy that would cause the first, second, and third thresholds to be exceeded but no the fourth threshold, and a fourth photon energy bin corresponds to photons having an energy that would cause the first, second, third, and fourth thresholds to be exceeded.

The values held in the counters can be processed to indicate how many photons were received for each energy bin. To that end, a logic circuit can be used for processing the value stored in the counters for producing, for each energy bin, the number of photons corresponding to that energy. For example, for a system outputting a collection of counter values of 1, 2, 2, 3, the resulting photons for each energy bin could be computed as 1 photon for the lowest (first) energy bin, 1 photon for the highest (fourth) energy bin, and one photon for the third energy bin. Such logic circuitry may be arranged inside a pixel. Alternatively, the computation can be performed by a remote processor using a hardware or software-based solution.

FIG. 2 illustrates a known implementation of the detector pixel of FIG. 1. Here, photoconductor 2 is formed by a photodiode, and signal processing unit 4 comprises a charge sensitive amplifier 4A and a shaper 4B. This latter circuit comprises a combination of a differentiator and an integrator. The various comparators are combined to form a discriminator bank 5, and the counters are combined into a counter array 6.

As shown by the corresponding signal shapes illustrated below the various components, the photocurrent corresponds to a spike signal representative for the electrons Qin that were generated as a result of the absorption of a photon. This signal is processed by CSA 4A and is converted into a signal Vcsa. The step height of this signal depends on the energy of the absorbed photon.

Signal Vcsa is then differentiated by the differentiator of shaper 4B resulting in a signal Vdif. The differentiation will remove any DC components in signal Vcsa. Next, signal Vdif is integrated resulting in a shaper output signal Vshaper emerging at the output of shaper 4B. The peak value of signal output signal Vshaper is indicative for the energy of the absorbed photon.

CSA 4A comprises a capacitor C1 arranged between an output and an inverting input of amplifier 7. A non-inverting input of amplifier 7 receives a reference signal and is for example set to a reference voltage V1. A reset switch 8 is arranged parallel to capacitor C1. In response to receiving an active reset signal, for example corresponding to a logical high, reset switch 8 is closed providing a path for discharging capacitor C1. Assuming an infinite gain and zero offset of amplifier 7, the voltage at the output of amplifier 7 will be reset to V1.

Inside pixel 1, a peak level in shaper output signal Vshaper is detected. This peak level is compared to various thresholds TH in comparator bank 5. The results of these comparisons are used for changing the values of counter array 6.

After having detected a peak level in shaper output signal Vshaper, a reset signal is generated inside pixel 1. This signal is fed to switch 8 and to shaper 4B. By resetting CSA 4A and shaper 4B, a next photon absorption event can be processed.

FIG. 3 illustrates an exemplary behavior of the voltage at the output of CSA 4A as a function of time t. In this case, over time, three photons are absorbed, each having the same energy level. As illustrated, spikes are generated due to the integrated photocurrent. More in particular, the positive edge is related to the integration of the photocurrent and the negative edge to the discharge of capacitor C1. As shaper 4B and comparators 5A, 5B require time to process the signal, it is required to maintain the signal at a constant value during a predefined amount of time between the edges.

As shown, when a photon is absorbed a voltage pulse Vp, referred to as the CSA output signal, is generated relative to a CSA base level Vbase. Furthermore, when resetting CSA 4A, the CSA output signal always returns to the same level, referred to as the first level V1.

FIG. 3 also illustrates rail voltage Vrail, representing the maximum voltage that can be outputted by amplifier 7. As the three pulses correspond to three identical photons, the height of the corresponding pulses should be identical. As can be seen in FIG. 3, the height of the first two pulses Vp is identical. However, the height of the last pulse Vp* is lower as insufficient headroom relative to Vrail is available. Accordingly, the CSA output signal will be under-estimated, and the energy of the corresponding photon will be determined incorrectly.

A cause for the incorrect determination of the energy of the photon is the shift in CSA base level Vbase. Typically, such shift can be associated with dark current that originates from photoconductor 2. Another source of a shifting CSA base level may be charge sharing between adjacent pixels. A detector typically comprises a plurality of pixels. When a photon is absorbed in a region at or close to the boundary between adjacent pixels, free electrons may be generated that flow to both adjacent pixels. For each pixel, such reduced photocurrent is seen as the absorption of a photon having a relatively low energy level. If this energy level is lower than the energy level associated with the first threshold of comparator bank 5, CSA 4A will not be reset allowing the CSA base level Vbase to gradually shift.

SUMMARY

Aspects of the present disclosure relate to an energy-resolving photon counting detector pixel in which the above-mentioned problem with insufficient headroom for the CSA output signal does not occur or at least to a lesser extent.

According to an aspect of the present disclosure this object is achieved using the energy-resolving photon counting detector pixel defined in claim 1. The pixel comprises a photoconductor, a charge sensitive amplifier, 'CSA', for integrating a photocurrent from the photoconductor and for outputting a CSA output signal relative to a CSA base level, and a CSA base level shift detector for determining a shift in the CSA base level over time relative to a first level. The pixel is configured to reset the CSA in dependence of the determined CSA base level shift.

By monitoring the CSA base level over time, it can be ensured that sufficient headroom remains available over time. Consequently, a more reliable determination of the energy associated with absorbed photons over time is made possible.

The pixel may comprise a counter for counting the number of times the CSA was reset in dependence of the determined CSA base level shift. This number can be used to correct an image that is construed based on the output of the pixel. For example, if a pixel requires 10 ns for resetting the CSA base level, and if that pixel has been reset 1000 times as a result of CSA base level shift during a time period of 1 s while 1000000 photons were detected during that time period, it can be concluded that of the is the pixel was 1000×10 ns=10 us unavailable for detecting photons. Consequently, the photon absorption rate was 1000000 photons per 999990 us, i.e. 1000010 photons/s. A correction can therefore be performed by replacing the measured 1000000 photons with 1000010 photons, which the pixel would have detected if the reset had been done infinitely fast.

The CSA can be configured for being reset in dependence of a reset signal. The pixel may then further comprise a shaper for shaping the CSA output signal and for outputting a shaper output signal. In addition, the pixel may comprise an energy-resolving unit for resolving an energy level associated with a photon by detecting a peak level of the shaper output signal and by comparing the detected peak level to a plurality of thresholds, wherein the energy-resolving unit is configured for outputting the reset signal in dependence of detecting the peak level. Furthermore, the CSA base level shift detector can be configured for outputting a CSA base level shift signal to the energy-resolving unit in dependence of the determination of the CSA base level shift. In this case, the energy-resolving unit can be further configured to output the reset signal in dependence of detecting the peak level and in dependence of the CSA base level shift signal. In such case, the reset signal will be set to an active state if a peak level has been detected and/or if a particular CSA base level shift has been detected. The CSA base level shift detector can be configured for comparing the CSA base level to the first level, and to output said CSA base level shift signal in dependence of an outcome of said comparing the CSA base level to the first level. For example, the CSA base level shift detector can be configured for comparing a difference between the CSA base level and the first level to a threshold and to output the CSA base level shift signal in dependence of an outcome of said comparing a difference between the CSA base level and the first level.

The reset signal may not only be used for resetting the CSA. In addition, the shaper may equally be reset using the reset signal. In other embodiments, the CSA base level shift signal is combined, using logic circuitry, with the reset signal from the energy-resolving unit thereby forming a combined reset signal that is provided to the CSA, and optionally also the shaper.

The energy-resolving unit may comprise a plurality of counters and a detecting unit. The detecting unit may be configured for detecting that the shaper output signal has reached a peak level, for outputting the reset signal in dependence of detecting the peak level, for comparing the peak level with a plurality of different thresholds, wherein each threshold is associated with a respective counter among the plurality of counters, and for changing a counter value of a counter among the plurality of counters if the peak level exceeds the threshold associated with that counter.

The detecting unit may comprise a plurality of comparators, each comparator being configured for comparing the shaper output signal to a respective threshold among the plurality of different thresholds, wherein outputs of the plurality of comparators form a current thermometer code. Such detecting unit may additionally comprise a plurality of latches, each latch being connected to a respective comparator among the plurality of comparators and having an output, the plurality of outputs of the plurality of latches forming a previous thermometer code. Furthermore, such detecting unit may comprise an asynchronous decision circuit connected to the plurality of comparators and the plurality of latches, wherein the asynchronous decision circuit is configured for determining that the peak level has been reached by comparing the previous thermometer code to the current thermometer code. The detecting may further comprise a reset signal generating unit configured for generating the reset signal in dependence of the asynchronous decision circuit determining that the peak level has been reached. Such reset signal generating unit may comprise a one-shot trigger generating unit.

Alternatively, the detecting unit may comprise a plurality of comparators, each comparator being configured for comparing the shaper output signal to a respective threshold among the plurality of different thresholds, wherein outputs of the plurality of comparators form a current thermometer code. In this case, the detecting unit also comprises a plurality of latches, each latch being connected to a respective comparator among the plurality of comparators and having an output, the plurality of outputs of the plurality of latches forming a previous thermometer code. However, instead of using asynchronous decision circuit, this embodiment of the detecting unit comprises a synchronous finite state machine that is connected to the plurality of comparators and the plurality of latches. It has a clock input and a reset signal output, and it is configured for determining that the peak level has been reached by comparing the previous thermometer code to the current thermometer code in dependence of a clock signal received at the clock input, and for setting the reset signal to an active state for at least one clock cycle after determining that the peak level has been reached.

In a different embodiment of the detecting unit, it comprises a plurality of dynamic comparators, each dynamic comparator being configured for comparing the shaper output signal to a respective threshold. In this case, the pixel further comprises a timing unit for detecting that the shaper output signal has reached a peak level, and for outputting a trigger signal in dependence of detecting that the shaper output signal has reached a peak level. Each of the plurality of dynamic comparators may be connected to a respective counter among the plurality of counters. Furthermore, each dynamic comparator may be configured to output a result of said comparing the shaper output signal to a respective threshold in dependence of the trigger signal. In this case, the outputs of the dynamic comparators can be connected directly to the counters.

The pixel may further comprise a combining unit for combining the CSA base level shift signal and the trigger signal from the timing unit for generating a combined reset signal and for providing the combined reset signal as the reset signal to be provided to the CSA and optionally to the shaper.

The abovementioned timing unit may comprise a differentiator for generating a derivative of the shaper output signal by differentiating the shaper output signal, and a comparator for comparing the derivative of the shaper output signal with a second threshold, and for outputting the trigger signal in dependence of an outcome of said comparing the derivative of the shaper output signal with a second threshold. The timing unit may comprise a hysteresis signal source for generating a hysteresis signal, and a hysteresis switch that is operable using the trigger signal, wherein the hysteresis switch is configured to provide the hysteresis signal to the comparator in addition to the derivative of the shaper output signal when the hysteresis switch is closed and to block the hysteresis signal from reaching the comparator when the hysteresis switch is open. In this case, the comparator can be configured for comparing the derivative of the shaper output signal with said second threshold when the hysteresis switch is open and for comparing the sum of the derivative of the shaper output signal and the hysteresis signal with said second threshold when the hysteresis switch is closed. Furthermore, the hysteresis switch can be configured to switch from closed to open when the trigger signal is indicative for indicating that the shaper output signal has reached a peak level.

In steady state, e.g. before an x-ray photon hits the pixel, the shaper output signal may also have a zero derivative. The timing unit should not trigger at this point. By adding a hysteresis current to the input of the current comparator, such situation may be avoided. In the steady state, the hysteresis current is routed to the input of the comparator and this forces the comparator output to be zero. Only if the derivative of the shaper output signal is sufficiently large, the comparator output goes high. This opens the hysteresis switch and turns of the hysteresis current. As a result, the high-to-low transition at the current comparator output is the exact moment in time when a peak in the shaper output signal occurs.

The pixel may further comprise a current source for outputting a dark current compensation current, wherein the CSA is configured for integrating the sum of the photocurrent and the dark current compensation current. The dark current of the photoconductor corresponds to a current still outputted by the photoconductor, either positive or negative, even though it does not absorb photons, for example due to the source of photons being switched off. By introducing a current that is equal in magnitude but opposite in sign it becomes possible to compensate for dark currents.

The CSA may comprise an amplifier having a first input connected to the photoconductor, a second input connected to a reference signal, and an output for outputting an amplified difference between a signal received at the first input and a signal received at the second input, wherein the amplifier is preferably an operational amplifier or an operational transconductance amplifier. The CSA may further comprise a capacitor arranged between the output of the amplifier and the first input of the amplifier, and a reset switch arranged in parallel to the capacitor and configured to bypass the capacitor for resetting the CSA. Here, a level of the reference signal preferably corresponds to the first level.

According to a second aspect of the present disclosure, a detector is provided that comprises a plurality of pixels as described above, wherein the pixels are arranged in a matrix of rows and columns.

According to a third aspect of the present disclosure, an energy-resolving photon counting system is provided that comprises a detector as described above, and a processor for processing an image based on counter values of the counters of the plurality of pixels. The processor is preferably configured for correcting the counter values of a pixel based on the number of resets performed for that pixel. These resets may include resets performed as a result of a peak level being detected in the shaper output signal, and resets performed as a result of the determined CSA base level shift, for example when the CSA base level shift exceeds a given threshold. Such correction is preferably performed for each pixel.

DESCRIPTION OF THE DRAWINGS

So that the manner in which the features of the present disclosure can be understood in detail, a more particular description is made with reference to embodiments, some of which are illustrated in the appended figures. It is to be noted, however, that the appended figures illustrate only typical embodiments and are therefore not to be considered limiting of its scope. The figures are for facilitating an understanding of the disclosure and thus are not necessarily drawn to scale. Advantages of the subject matter claimed will become apparent to those skilled in the art upon reading this description in conjunction with the accompanying figures, in which like reference numerals have been used to designate like elements, and in which:

FIG. 4 illustrates an embodiment of a pixel 100 in accordance with an aspect of the present disclosure. It comprises a photoconductor 130, for example a photoconductor comprising a piece of photo-absorbing material, such as Cadmium Telluride, arranged in between electrodes. Photoconductor 130 is connected to the inverting input of amplifier 7, which can be embodied as an operational transconductance amplifier or an operational amplifier. The non-inverting input of amplifier 7 is connected to a reference signal, here represented as a reference voltage V1. It should be noted that other reference signals, including currents, are not excluded from the present disclosure.

Output of amplifier 7 is connected via a capacitor C1 to its inverting input. A switch 8 is arranged parallel to capacitor C1. Switch 8 opens or closes in dependence of a reset signal. Switch 8, amplifier 7, and capacitor C1 form part of a charge sensitive amplifier, CSA, 110.

Figure 1:
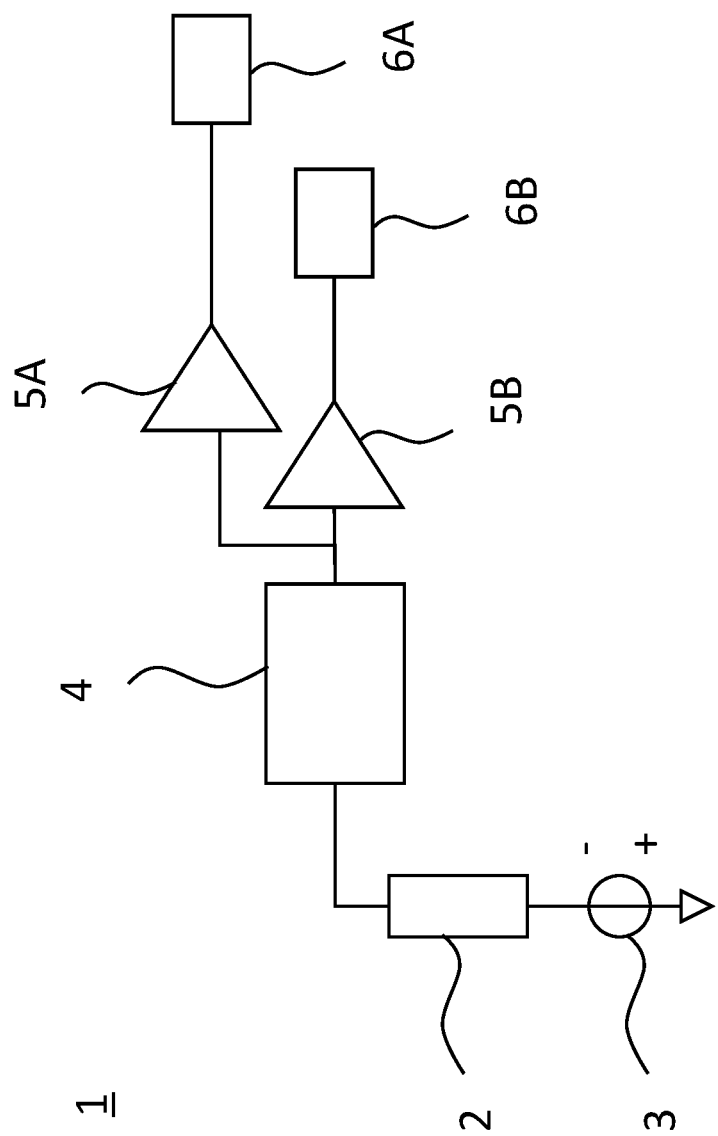
FIG. 1 illustrates a known energy-resolving photon counting pixel for an energy-resolving photon counting detector.
Figure 2:
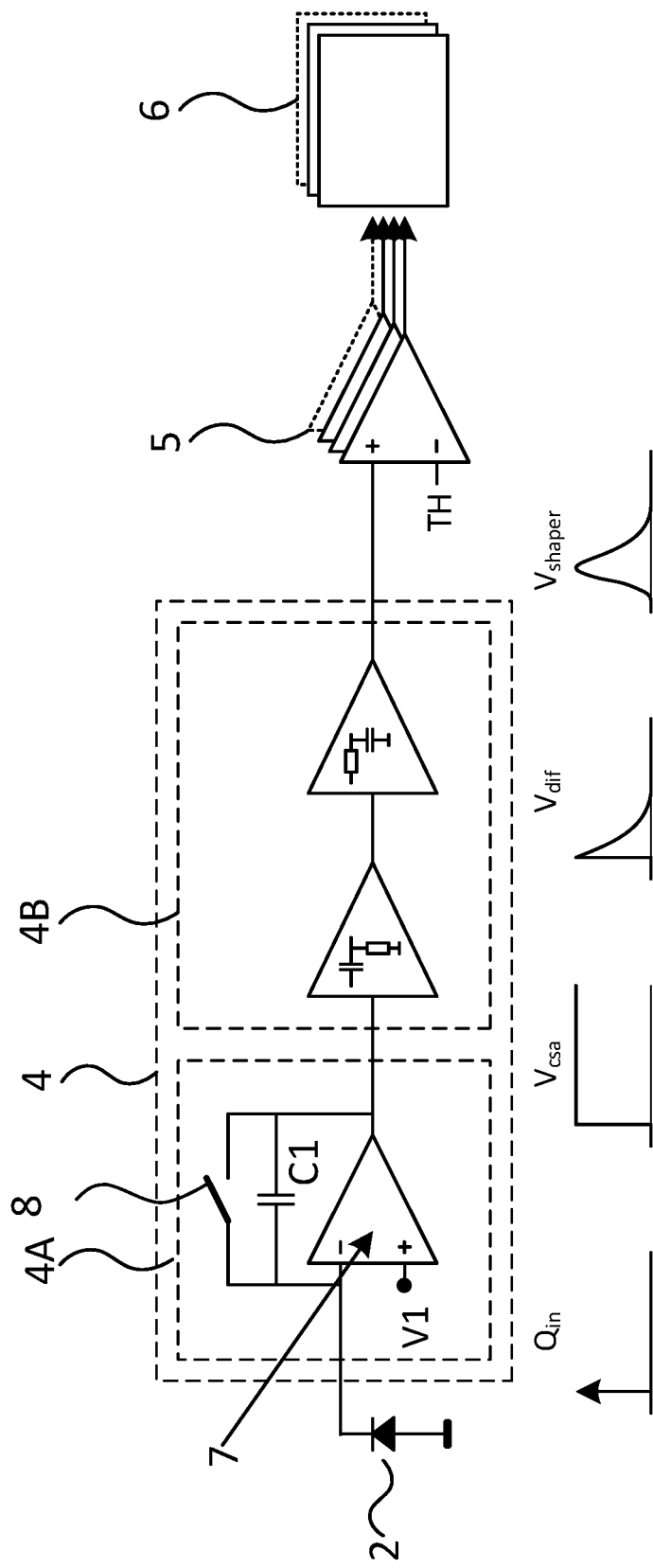
FIG. 2 illustrates a known implementation of the energy-resolving photon counting pixel of FIG. 1.
Figure 3:
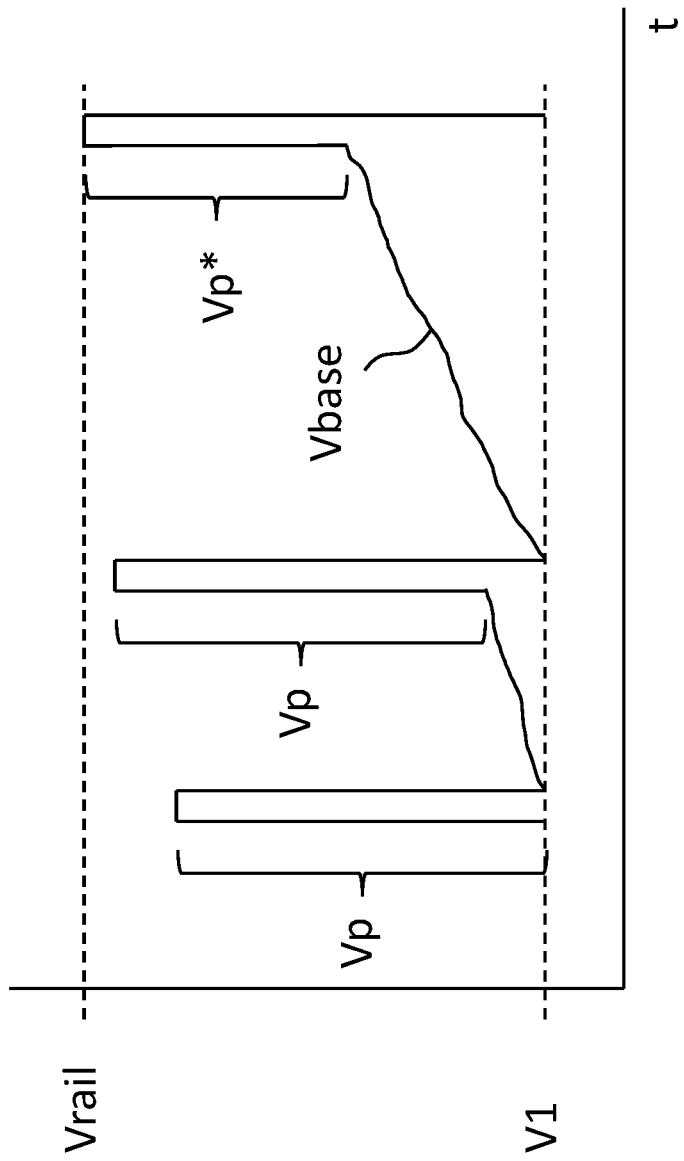
FIG. 3 illustrates an exemplary behavior of the voltage at the output of the CSA of the energy-resolving photon counting pixel of FIG. 2 as a function of time.

Similar to the CSA shown in connection with FIGS. 2 and 3, CSA 110 integrates a photocurrent from photoconductor 130 and outputs a CSA output signal VCSAout relative to a CSA base level.

Pixel 100 further comprises a CSA base level shift detector 120. This detector determines a shift in the CSA base level over time relative to the first level.

Figure 4:
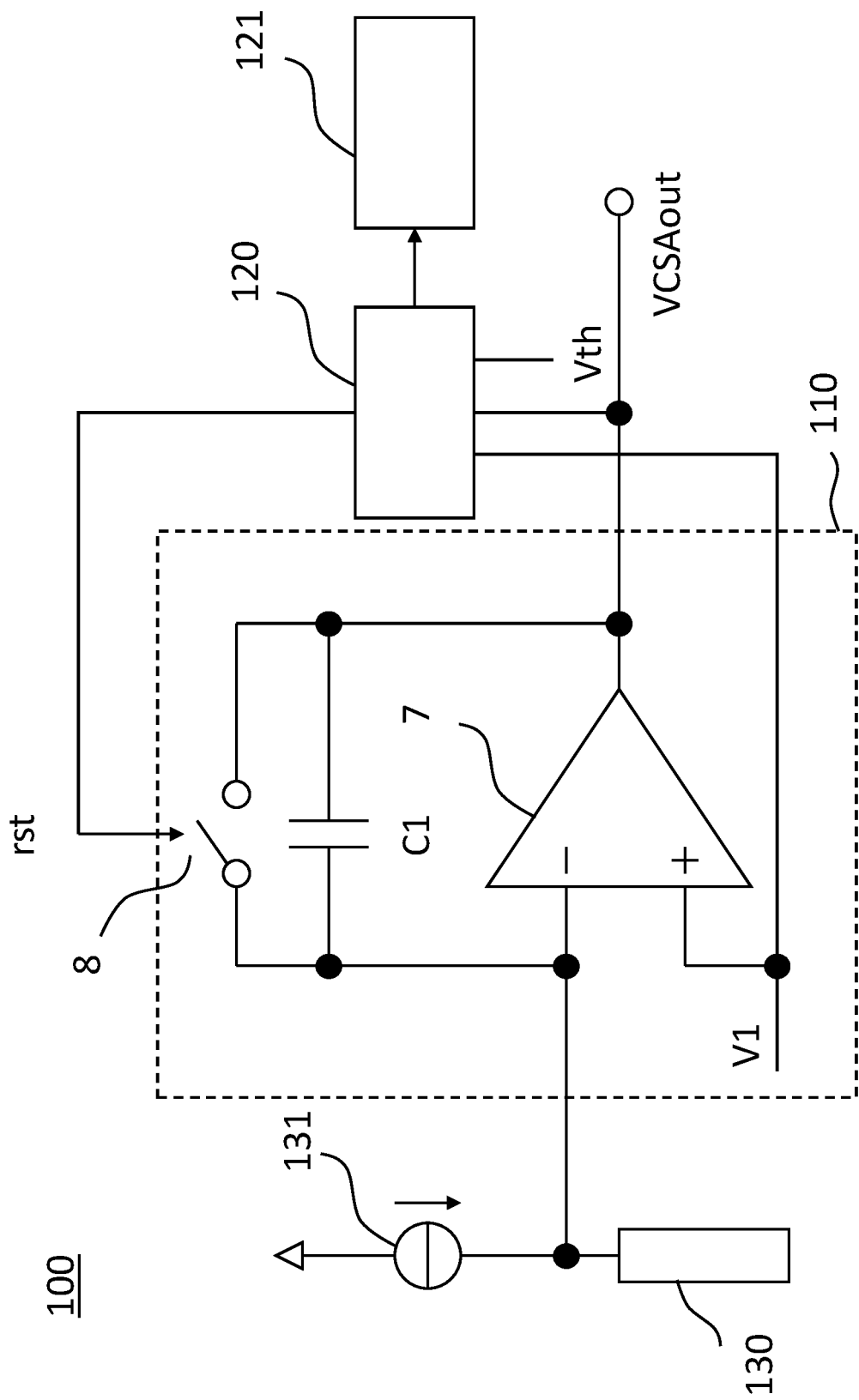
FIG. 4 illustrates a first embodiment of an energy-resolving photon counting pixel in accordance with an aspect of the present disclosure.

In FIG. 4 it is assumed that the first level corresponds to reference voltage V1. Non-idealities of amplifier 7 may however cause the actual first level to deviate slightly from voltage V1.

CSA base level shift detector 120 compares the CSA base level to the first level to determine a shift in the CSA base level. This is achieved by monitoring the CSA output signal VCSAout. As shown in FIG. 3, this signal may comprise rapidly varying components related to the absorption of high-energic photons, and slowly varying components related to charge sharing or dark currents of photoconductor 130. CSA base level shift detector 120 monitors the slowly varying components to determine the CSA base level shift. For example, CSA base level shift detector 120 may have a low-pass filter functionality to filter out the rapidly varying components.

If the CSA base level shift exceeds a certain threshold Vth, a reset signal rst may be generated for controlling switch 8 and for resetting VCSAout to V1. It should be noted that the present disclosure equally relates to positive and negative CSA base level shifts.

In FIG. 4, the reset signal is directly outputted by CSA base level shift detector 120. As will be shown in FIG. 5, reset signal rst may also be generated by an other component of pixel 100. In this case, CSA base level shift detector 120 will output a signal to such other component that will in turn generate reset signal in dependence of the signal from CSA base level shift detector 120, which signal is hereinafter referred to as the CSA base level shift signal.

Pixel 100 further comprises a counter 121 for counting the number of times CSA 110 was reset to first level V1 in dependence of the determined CSA base level shift. During the reset of CSA 110, a photocurrent related to a photon absorbed during the reset cannot be processed. The time required for resetting CSA 110 is referred to as dead time. As will be explained later, the number of times CSA 110 was reset to correct the CSA base level can be used to correct an image.

To compensate for dark currents of photoconductor 130, pixel 100 may comprise a current source 131 that outputs a current to the inverting input of amplifier 7. The sum of the photocurrent from photoconductor 130 when it is not exposed to photons or when it is not absorbing photons, referred to as the dark current, and the current from current source 131 should average to zero over time as much as possible.

Figure 5:
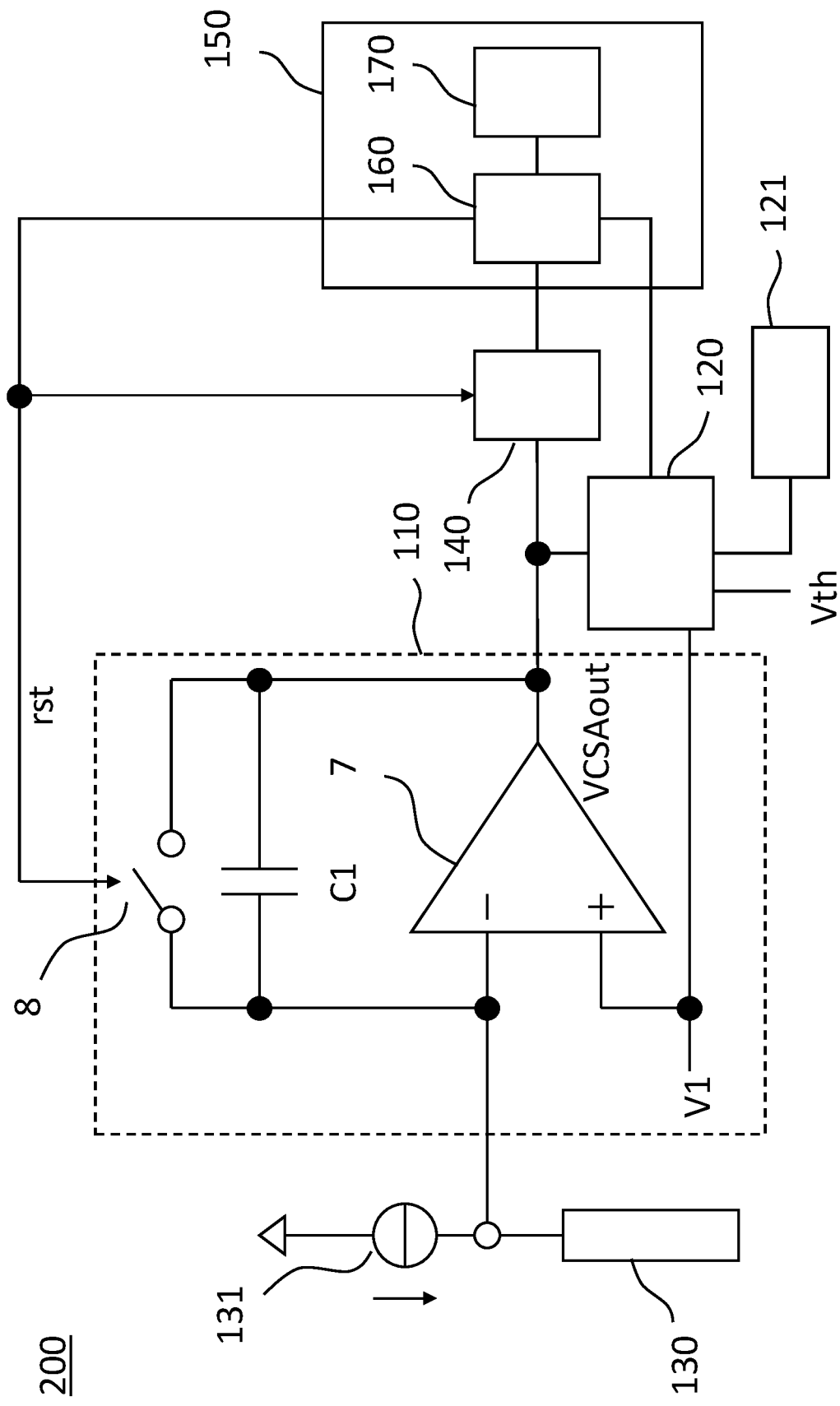
FIG. 5 illustrates a second embodiment of an energy-resolving photon counting pixel in accordance with an aspect of the present disclosure.

FIG. 5 illustrates a further pixel 200 according to an aspect of the present disclosure. It comprises the components of pixel 100. In addition, pixel 200 comprises a shaper 140 for shaping CSA output signal VCSAout.

Shapers are known in the art. An exemplary shaper may comprise an amplifier, such as an operational amplifier or an operational transconductance amplifier, having an inverting input, a non-inverting input, and an output. The inverting input may be connected to an output of CSA 110 through a capacitor in series with a resistor. Furthermore, the inverting input may be connected to the output via a parallel connection of a capacitor and a resistor. The non-inverting input may receive a reference signal. For example, a voltage at the non-inverting input may be set to a reference voltage.

Using the components described above, shaper 140 first differentiates the output of CSA 110 and then performs an integration. The shaper output is therefore not sensitive to the slowly varying CSA base level.

Pixel 200 further comprises an energy-resolving unit 150 for resolving an energy level associated with a photon by detecting a peak level of the shaper output signal and by comparing the detected peak level to a plurality of thresholds, wherein the energy-resolving unit is configured for outputting the reset signal in dependence of detecting the peak level.

Energy-resolving unit 150 comprises a plurality of counters 170, represented in FIG. 5 as a single block, and a detecting unit 160. Here, detecting unit 160 is configured for detecting that the shaper output signal has reached a peak level. It further outputs the reset signal rst in dependence of detecting the peak level. For example, it will set a logic level of reset signal rst to an active level when it has detected the peak level of the shaper output signal. The active level, which may correspond to a logic low or high level, is the level at which switch 8 closes for discharging capacitor C1. In addition, reset signal rst is also used for resetting shaper 140.

Detecting unit 160 is further configured for comparing the peak level with a plurality of different thresholds, wherein each threshold is associated with a respective counter 170 among the plurality of counters 170. If the peak level exceeds a threshold associated with that counter 170, detecting unit 160 will change a counter value of that counter 170. For example, it will increase the counter value by one.

In the embodiment of FIG. 4, CSA base level shift detector 120 directly outputted a reset signal to switch 8. However, in FIG. 5, CSA base level shift detector 120 is configured for outputting a CSA base level shift signal to energy-resolving unit 150 in dependence of the determination of the CSA base level shift. More in particular, the CSA base level shift signal is provided to detecting unit 160. In this case, energy-resolving unit 150, and more in particular detecting unit 160, is further configured to output reset signal rst in dependence of detecting the peak level and in dependence of the CSA base level shift signal. For example, CSA base level shift detector 120 is configured for comparing the CSA base level to the first level. If the CSA base level has shifted relative to the first level by an amount larger than a given threshold, CSA base level shift detector 120 outputs an according CSA base level shift signal to detecting unit 160. For example, a logic high value for the CSA base level shift signal may indicate that CSA base level shift detector 120 has detected an unacceptable shift in CSA base level. Accordingly, energy-resolving unit 150, and more in particular detecting unit 160, will set the reset signal to an active level when a) a peak level in the shaper output signal is detected, and/or b) when an excessive shift in the CSA base level has been detected.

In some embodiments, detecting unit 160 will only set the reset signal to active when the peak level in the shaper output signal unit is detected. In such case, logic circuitry such as an OR gate can be used to combine the output of CSA base level shift detector 120 and the reset signal from detecting unit 160 for generating a combined reset signal that is sent to switch 8 and optionally also to shaper 140.

Figure 6:
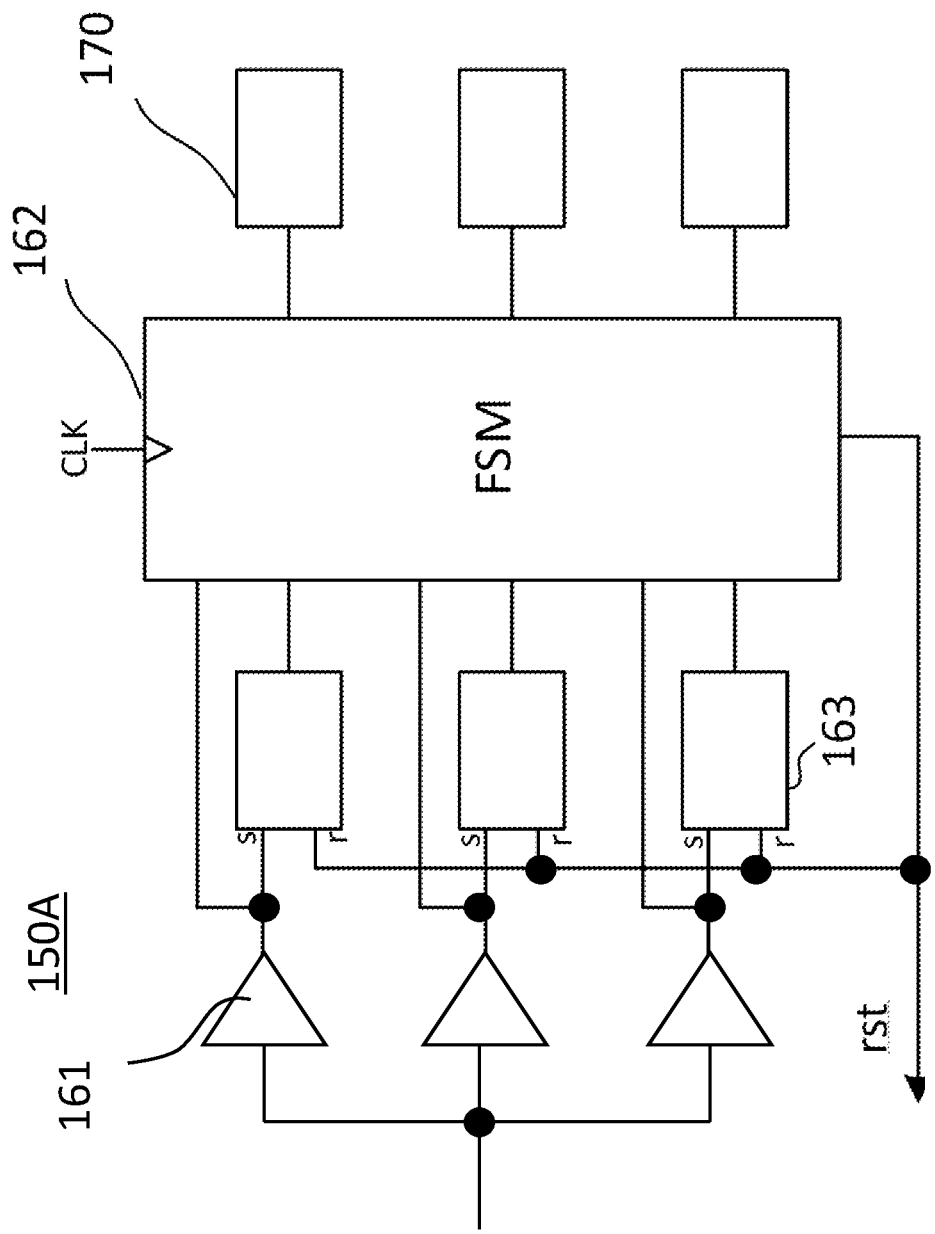
FIG. 6 illustrates a first embodiment of an energy-resolving unit in accordance with an aspect of the present disclosure for the pixel of FIG. 5.

FIG. 6 illustrates a first embodiment of energy-resolving unit 150A. Here, the output of shaper 140 is processed by bank of comparators 161, each with a different threshold level. These threshold levels divide the incoming photons into energy bins. The incident photons are counted in their respective energy bins in counters 170.

The outputs of comparators 161 are processed by a finite state machine, FSM, 162. As the shaper output signal increases, it first crosses the threshold of comparator 161 with the lowest threshold. Subsequently, it crosses the threshold of the next comparator 161, and so on. As a result, the outputs of comparators 161, which form the input of FSM 162, can be described as a thermometer code (0000→0001→0011→0111). During the rise of the shaper output signal, the thermometer code is increasing. When the shaper output signal starts to drop, eventually the thermometer code decreases. The drop of the thermometer code signifies that the peak of the shaper output signal has passed. At this time, the counter 170 that corresponds to the appropriate energy bin can be increased and at this time shaper 140 and CSA 110 can be reset. FSM 162 can generate the appropriate counter pulse and reset signal rst.

FSM 162 is a synchronous FSM. The thermometer code, which corresponds to the outputs of comparators 161, is latched by SR latches 163. In this manner the peak thermometer output code is stored, even if the peak output code is only of very short duration and if this peak output code occurs in-between clock edges of the master clock of finite state machine 162. At every rising (or falling) edge of the clock, CLK, signal, the logic in FSM 162 checks whether the current value of the thermometer code is smaller than the peak value of the thermometer code which is stored in SR latches 163. If the current thermometer code is below the peak thermometer code (which is not zero) then counters 170 corresponding to the peak thermometer code are incremented by one and a reset signal rst is generated. Counters 170 can be simple ripple counters, in which case the signal between FSM 162 and a counter 170 is the clock for the flip-flop that represents the LSB of the ripple counter. The reset signal and the signals towards counters 170 can be generated in the clock domain of FSM 162 in this implementation. Reset signal rst can be used to reset SR latches 163 and at the same time reset CSA 110 and shaper 140. As a result of this reset, the outputs of comparators 161 will also be reset.

FSM 162 can be configured to control counters 170 using the thermometer code that corresponds to the peak level of the shaper output signal. In this case, FSM 162 may increase the counter values of multiple counters 170 when a peak value is detected.

Alternatively, FSM 162 can be configured to only increase the counter value of counter 170 that corresponds to comparator 161 having the highest threshold value. In this case, the counter value of a counter directly provides information on how many photons having an energy corresponding to the energy bin that is associated with that counter have been received in a given time interval. Similar information can be derived when FSM 162 increases multiple counter values at a time. The processing required for making these calculations can be performed outside the pixel.

Figure 7:
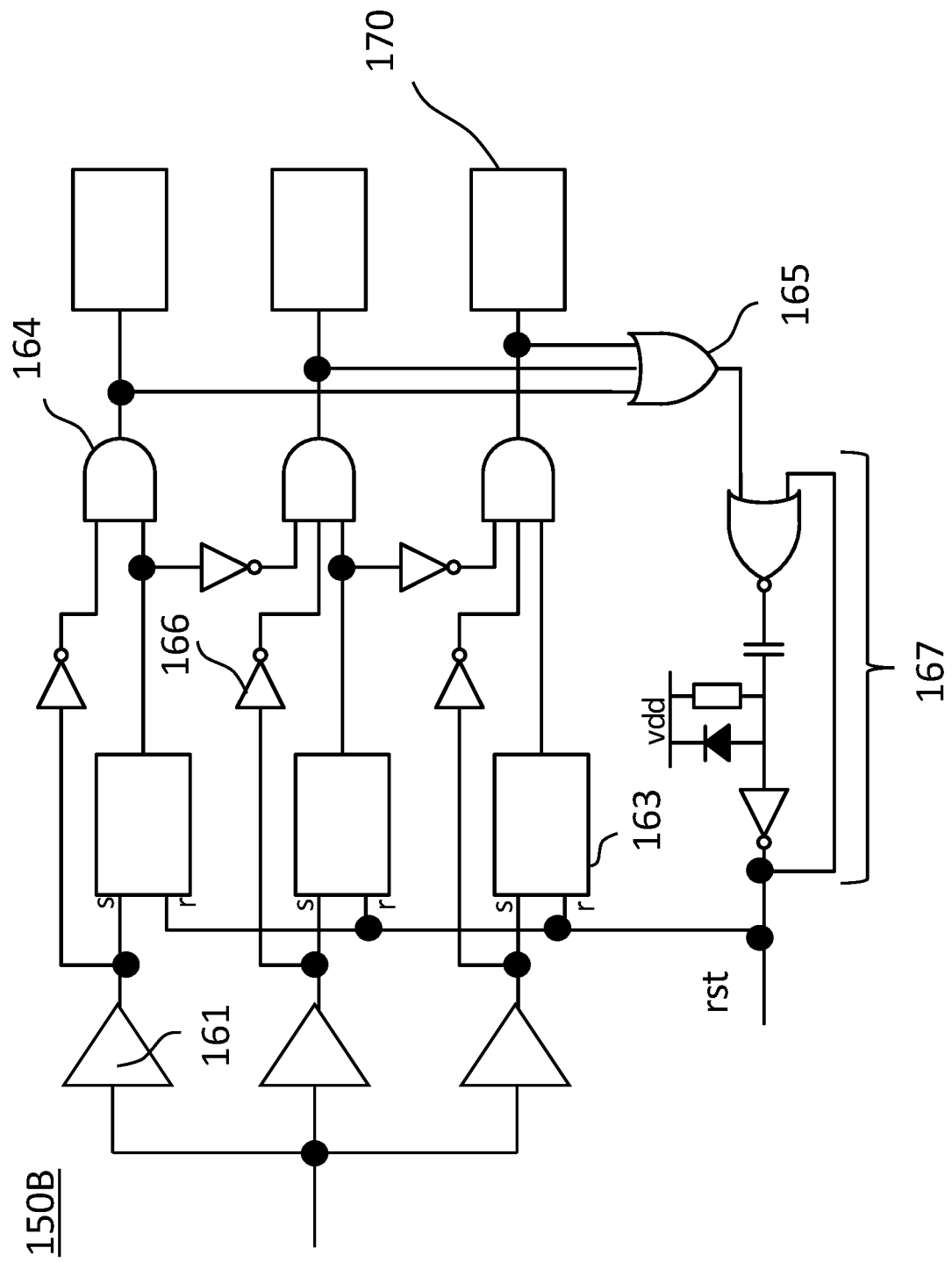
FIG. 7 illustrates a second embodiment of an energy-resolving unit in accordance with an aspect of the present disclosure for the pixel of FIG. 5.

An alternative circuit for realizing energy-resolving unit 150B that does not use a clock is shown in FIG. 7. Here, energy-resolving unit 150 comprises AND gates 164, OR gate 165, and inverters 166. As in the embodiment of FIG. 6, the peak thermometer code is stored in latches 163. An input pulse to a counter 170 corresponding to a certain peak thermometer value is generated by AND gates 164 if: the latch 163 that stores the higher thermometer bit contains a zero, AND the latch 163 that stores the corresponding thermometer bit contains a one, AND the current value of the thermometer bit is below the corresponding thermometer bit. This implies that a count pulse is generated only when the thermometer code starts to drop and only for the highest bit in the thermometer code that reached a logic one. When a counter pulse is generated the 3-input OR gate at the bottom of the circuit triggers a monostable multivibrator 167. Multivibrator 167 generates a reset pulse rst for SR latches 163 at the thermometer input and also provides a reset signal rst for CSA 110 and shaper 140. The duration of the counter pulse is set by the delay in the circuitry that generates reset signal rst. If the counter pulses become too short, an additional delay element can be inserted in the reset generation circuitry. The duration of the reset pulse is set by the RC time constant of monostable multivibrator 167. It is important that the thermometer bit inputs do not have multiple transients on their edges because these would generate multiple counter clock pulses. To avoid this problem the comparator in the analog front end can be made with hysteresis.

Another possible implementation of energy-resolving unit uses dynamic latched comparators. Dynamic comparators are instable circuits which are preset into an unstable operating point in which they consume zero power. When released from this state, by a clock or trigger signal, these circuits quickly settle into stable state depending on the sign of an input signal. In this stable state they also consume zero power. Dynamic comparators are very popular because they provide excellent (fast) operation at minimal power consumption.

Figure 8:
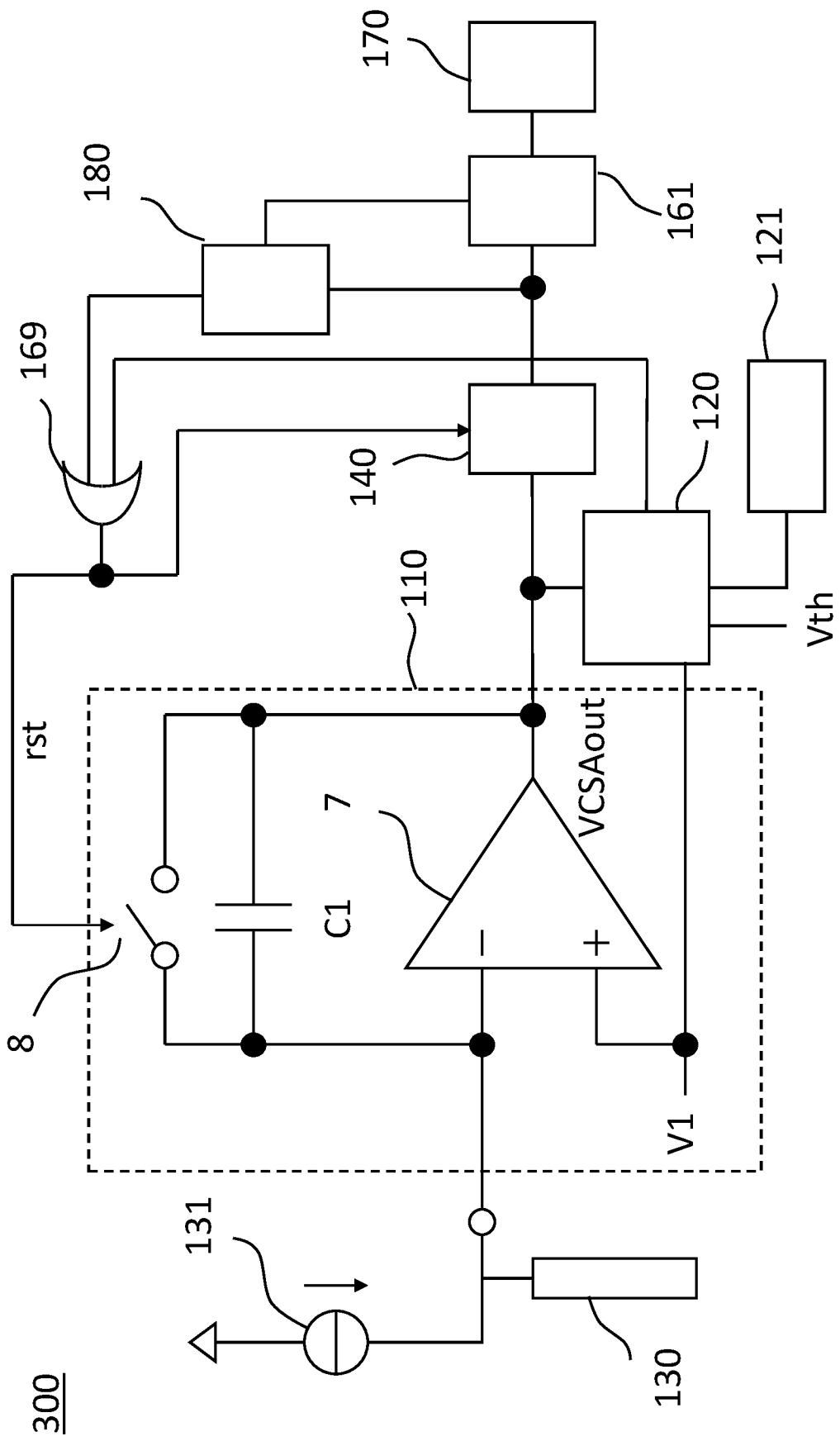
FIG. 8 illustrates a third embodiment of an energy-resolving unit in accordance with an aspect of the present disclosure for the pixel of FIG. 5.

FIG. 8 shows an implementation of pixel 300 in which an energy-resolving unit 150C is used that uses dynamic comparators 161. Dynamic comparators 161 do not continuously observe the shaper output signal, so they do not continuously provide a thermometer output code for observation by an FSM as discussed in connection with FIGS. 6 and 7. Instead, a trigger signal has to be provided to dynamic comparators 161 to make their decision at the right moment in time, i.e. at the moment that the shaper output signal peaks. An advantage of this approach is the reduced power consumption, but a suitable timing unit 180 is required.

Timing unit 180 is configured to find the peak of the shaper output signal. It also generates a peak signal which is combined, using OR gate 169, with the CSA base level shift signal for generating a reset signal rst that is provided to CSA 110 and shaper 140.

In FIG. 8, timing unit 180, OR gate 169, and comparators 161 are part of the detection unit.

Figure 9:
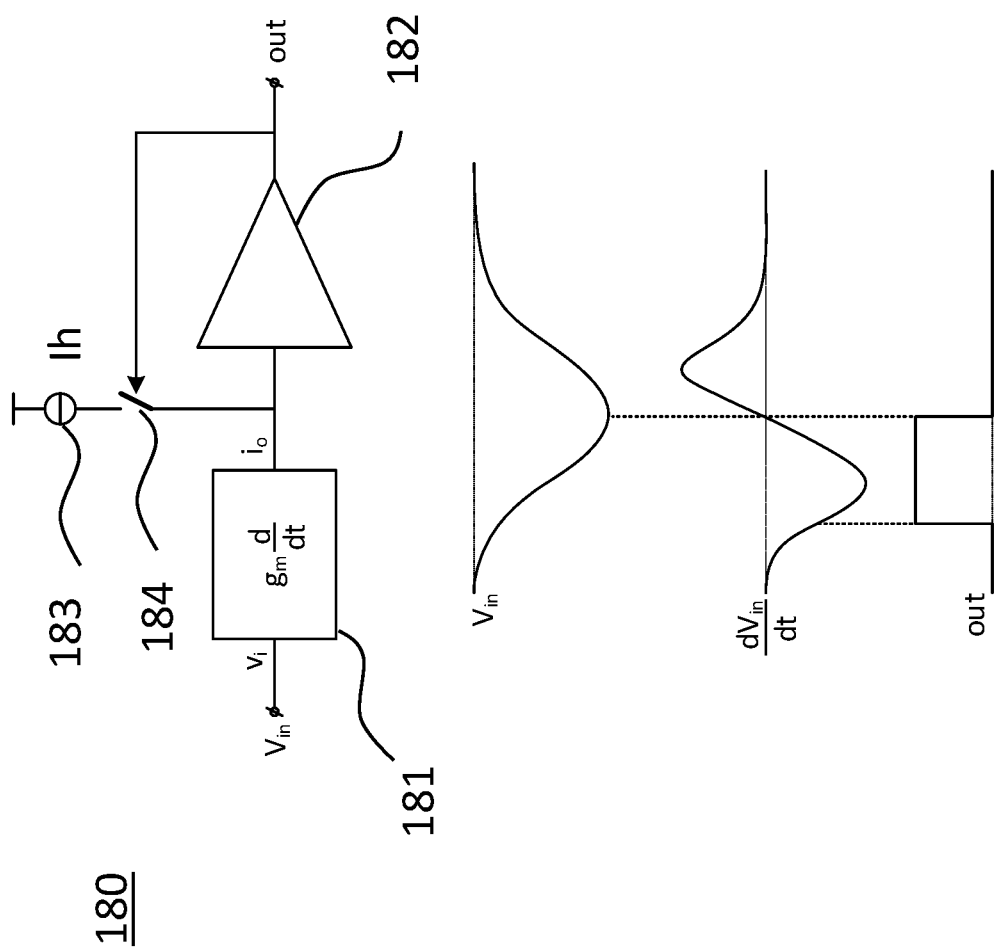
FIG. 9 illustrates an implementation of the timing unit in accordance with an aspect of the present disclosure for the energy-resolving unit of FIG. 8.

A suitable conceptual implementation of timing unit 180 is shown in FIG. 9. The purpose of timing unit 180 is to find the peak of the shaper output signal. To this end, the shaper output voltage is differentiated and converted into a current by differentiator 181. A current comparator 182 triggers when this current equals zero. In this manner the time at which the peak occurs is determined. In steady state, e.g. before an x-ray photon hits, the shaper output signal also has zero derivative. Timing unit 180 should not trigger at this point. For this reason, a hysteresis current Ih is added to the input of the current comparator 182 by current source 183. In steady state, the hysteresis current is routed to the input of current comparator 182 and this forces comparator 182 output to be zero. Only if the derivative of the shaper output signal is sufficiently large does the comparator output go high. This turns of the hysteresis current via switch 184 and as a result the high-to-low transition at the current comparator output is the exact moment in time when the peak in the shaper output signal occurs. The falling edge of the comparator output can be used as a trigger signal to dynamic comparators 161. The same logic edge can also be used to start a monostable multivibrator similar to multivibrator 167 of FIG. 7 to generate the peak signal of a certain duration to be combined with the CSA base level shift signal for generating reset signal rst.

In FIG. 8, the CSA base level shift signal is combined with the peak signal of timing unit 180 using OR gate 169. In an alternative embodiment, an alternative OR gate is used for combining a logic edge in the CSA base level shift signal with a logic edge in the peak signal and then trigger a monostable multivibrator similar to multivibrator 167 of FIG. 8.

Figure 10:
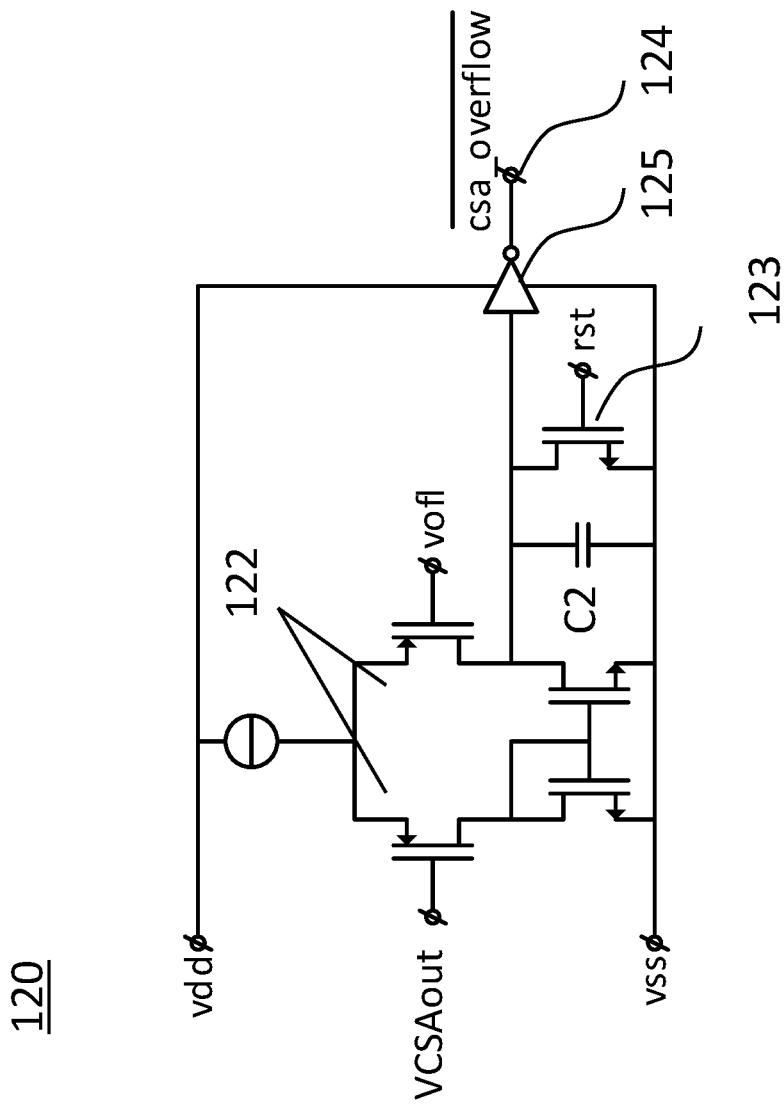
FIG. 10 illustrates an embodiment of a CSA base level shift detector in accordance with an aspect of the present disclosure.

FIG. 10 illustrates an embodiment of CSA base level shift detector 120. In this embodiment, the PMOS differential pair 122 compares the output of CSA 110, VCSAout with a reference voltage Vofl. If VCSAout is larger than Vofl, the PMOS on the right of PMOS differential pair 122 will slowly charge capacitor C2. Choosing a small tail current for differential pair 122, in addition to using capacitor C2, will result in the fact that VCSAout has to remain at a high level during a considerable amount of time before output 124 of CSA base level shift detector assumes a low value. The CSA base level shift signal outputted by CSA 120 at output 124 is a low active digital signal, indicated as csa_overflow (barred), that is generated by inverter 125 based on the voltage over capacitor C2. The delay realized in this manner should only be at the high-to-low transition of the CSA output signal.

In case the CSA needs to be reset to correct a CSA base level shift, CSA 110 is reset first to reset the CSA base level. Next, the logic circuitry that indicates that the CSA base level needs to be reset needs to return to its default state. This can be realized by resetting capacitor C2 via NMOS 123 during the reset of CSA 110.

Figure 11:
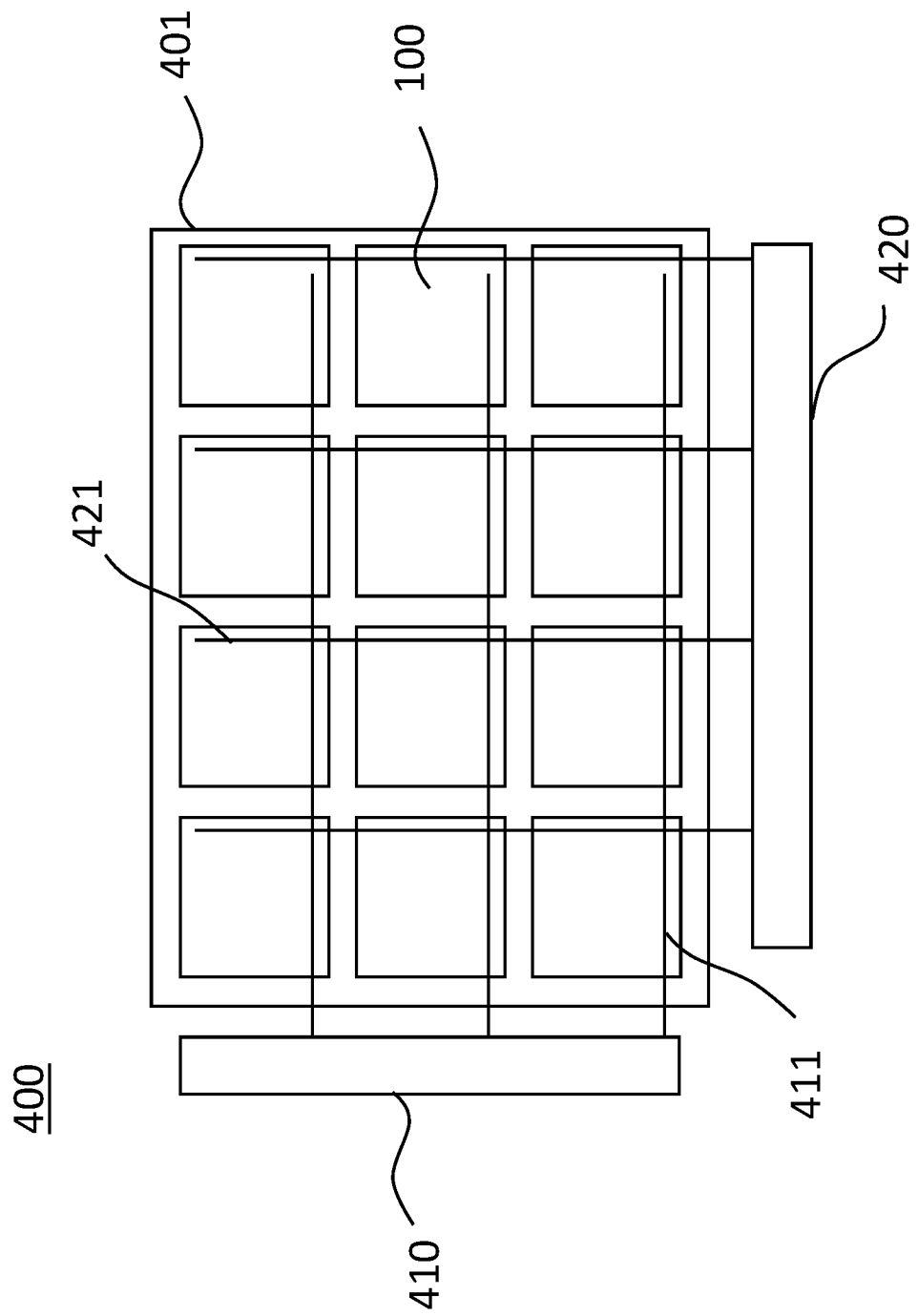
FIG. 11 illustrates an embodiment of a detector in accordance with an aspect of the present disclosure.

FIG. 11 illustrates an energy-resolving photon counting detector 400 according to an aspect of the present disclosure. It comprises a substrate assembly 401 on which a plurality of detector pixels 100 is arranged in a matrix of rows and columns. Substrate assembly 401 comprises the photoconductor material and the semiconductor material used for realizing the electronic circuitry of detector pixel 100. Typically, substrate assembly 401 comprises a substrate for the photoconductor and a separate substrate for the electronic circuitry.

Pixel 400 may correspond to pixel 100, pixel 200, or pixel 300.

Detector 400 comprises a selecting unit 410 that is configured to select a row of pixels 100 for readout the values in the counters of pixels 100 in a given row. Detector 400 further comprises readout circuitry 420 for reading out the counter values of pixels 100 using a plurality of bus lines 421. Readout circuitry 420 can provide the collected values to an external device for further processing.

Typically, selecting unit 410 and readout circuitry 420 are arranged on the same substrate of substrate assembly 401 as the substrate on which the electronic circuitry is realized.

Figure 12:
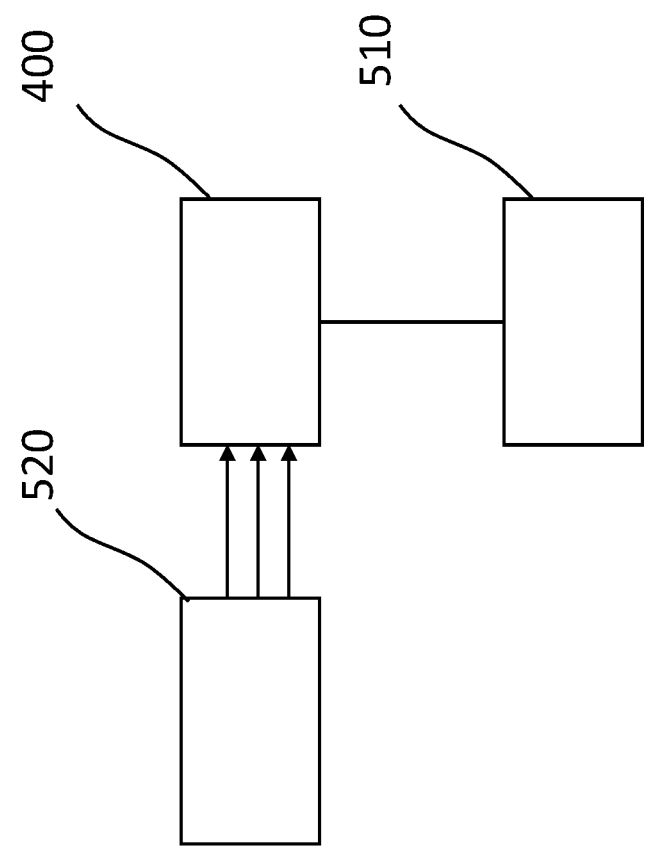
FIG. 12 illustrates an embodiment of energy-resolving photon counting system in accordance with an aspect of the present disclosure.

FIG. 12 illustrates an embodiment of an energy-resolving photon counting system 500, comprising detector 400 of FIG. 11 and a processor 510 for processing an image based on the counter values of the counters of the plurality of pixels. During operation, a source of photons, for example an X-ray source 520, will emit photons towards detector 400. During a predefined amount of time, photons will be absorbed. At the end of the predefined amount of time, the counter values of all counters of all pixels of detector 400 will be readout and provided to processor 510. This processor will determine for each pixel the number of photons that were absorbed by that pixel and the energy levels of those pixels. Based on this information, processor 510 generates one or more images.

Processor 510 may correct pixel counter values of a pixel based on the number of resets performed for that pixel during the predefined amount of time. These resets may include resets as a result of detecting a peak value in the shaper output signal or resets as a result of a CSA base level shift becoming too large. To this end, the total amount of available time for a pixel may be computed as the predefined amount of time minus the combined time during which the pixel was reset. Typically, this combined time equals the number of resets times the time required for a reset. Next, a correction factor can be computed as the predefined amount of time divided by the total amount of time. A pixel count, i.e. the number of photons for a specific energy bin, can be corrected by multiplying the original pixel count with the correction factor. In this manner, each pixel count can be corrected for a pixel. In addition, this process can be performed for each pixel of detector 400, where it is noted that the correction factors for different pixels may be different.

In the above, the present invention has been described using detailed embodiments thereof. However, the present invention is not limited to these embodiments. Instead, various modifications are possible without departing from the scope of the present invention which is defined by the appended claims and their equivalents.

Particular and preferred aspects of the invention are set out in the accompanying independent claims. Combinations of features from the dependent and/or independent claims may be combined as appropriate and not merely as set out in the claims.

The scope of the present disclosure includes any novel feature or combination of features disclosed therein either explicitly or implicitly or any generalization thereof irrespective of whether or not it relates to the claimed invention or mitigate against any or all of the problems addressed by the present invention. The applicant hereby gives notice that new claims may be formulated to such features during prosecution of this application or of any such further application derived therefrom. In particular, with reference to the appended claims, features from dependent claims may be combined with those of the independent claims and features from respective independent claims may be combined in any appropriate manner and not merely in specific combinations enumerated in the claims.

Features which are described in the context of separate embodiments may also be provided in combination in a single embodiment. Conversely, various features which are, for brevity, described in the context of a single embodiment, may also be provided separately or in any suitable sub combination.

The term "comprising" does not exclude other elements or steps, the term "a" or "an" does not exclude a plurality. Reference signs in the claims shall not be construed as limiting the scope of the claims.

The invention claimed is:

1. An energy-resolving photon counting detector pixel, comprising:
    a photoconductor;
    a charge sensitive amplifier, 'CSA', for integrating a photocurrent from the photoconductor and for outputting a CSA output signal relative to a CSA base level; and
    a CSA base level shift detector for determining a shift in the CSA base level over time relative to a first level;
    wherein the pixel is configured to reset the CSA in dependence of the determined CSA base level shift.

2. The pixel according to claim 1, wherein the pixel further comprises a shaper configured to shape the CSA output signal and to output a shaper output signal, wherein the pixel is configured to further reset the CSA in dependence of detecting a peak level of the shaper output signal.

3. The pixel according to claim 1, wherein the CSA is configured for being reset in dependence of a reset signal, said pixel further comprising:
    an energy-resolving unit for resolving an energy level associated with a photon by detecting the peak level of the shaper output signal and by comparing the detected peak level to a plurality of thresholds, wherein the energy-resolving unit is configured for outputting the reset signal in dependence of detecting the peak level.

4. The pixel according to claim 3, wherein the CSA base level shift detector is configured for outputting a CSA base level shift signal to the energy-resolving unit in dependence of the determination of the CSA base level shift; and
    wherein the energy-resolving unit is further configured to output the reset signal in dependence of detecting the peak level and in dependence of the CSA base level shift signal.

5. The pixel according to claim 4, wherein the CSA base level shift detector is configured for comparing the CSA base level to the first level, and to output said CSA base level shift signal in dependence of an outcome of said comparing the CSA base level to the first level.

6. The pixel according to claim 5, wherein the CSA base level shift detector is configured for comparing a difference between the CSA base level and the first level to a threshold and to output the CSA base level shift signal in dependence of an outcome of said comparing a difference between the CSA base level and the first level to a threshold.

7. The pixel according to claim 3, wherein the energy-resolving unit comprises:
    a plurality of counters;
    a detecting unit configured for:
        detecting that the shaper output signal has reached a peak level;
        outputting the reset signal in dependence of detecting the peak level;
        comparing the peak level with a plurality of different thresholds, wherein each threshold is associated with a respective counter among the plurality of counters;
        changing a counter value of a counter among the plurality of counters if the peak level exceeds the threshold associated with that counter.

8. The pixel according to claim 7, wherein the detecting unit comprises:
    a plurality of comparators, each comparator being configured for comparing the shaper output signal to a respective threshold among the plurality of different thresholds, wherein outputs of the plurality of comparators form a current thermometer code;
    a plurality of latches, each latch being connected to a respective comparator among the plurality of comparators and having an output, the plurality of outputs of the plurality of latches forming a previous thermometer code;
    an asynchronous decision circuit connected to the plurality of comparators and the plurality of latches, wherein the asynchronous decision circuit is configured for determining that the peak level has been reached by comparing the previous thermometer code to the current thermometer code; and a reset signal generating unit configured for generating the reset signal in dependence of the asynchronous decision circuit determining that the peak level has been reached.

9. The pixel according to claim 7, wherein the detecting unit comprises:
- a plurality of comparators, each comparator being configured for comparing the shaper output signal to a respective threshold among the plurality of different thresholds, wherein outputs of the plurality of comparators form a current thermometer code;
- a plurality of latches, each latch being connected to a respective comparator among the plurality of comparators and having an output, the plurality of outputs of the plurality of latches forming a previous thermometer code;
- a synchronous finite state machine being connected to the plurality of comparators and the plurality of latches and having a clock input and a reset signal output, wherein the finite machine is configured for determining that the peak level has been reached by comparing the previous thermometer code to the current thermometer code in dependence of a clock signal received at the clock input, and for setting the reset signal to an active state for at least one clock cycle after determining that the peak level has been reached.

10. The pixel according to claim 7, wherein the detecting unit comprises a plurality of dynamic comparators, each dynamic comparator being configured for comparing the shaper output signal to a respective threshold, wherein the pixel further comprises a timing unit for detecting that the shaper output signal has reached a peak level, and for outputting a trigger signal in dependence of detecting that the shaper output signal has reached a peak level;
- wherein each of the plurality of dynamic comparators is connected to a respective counter among the plurality of counters, and wherein the dynamic comparators are each configured to output a result of said comparing the shaper output signal to a respective threshold in dependence of the trigger signal;
- wherein the pixel further comprises a combining unit for combining the CSA base level shift signal and the trigger signal from the timing unit for generating a combined reset signal and for providing the combined reset signal as the reset signal to be provided to the CSA and optionally to the shaper.

11. The pixel according to claim 10, wherein the timing unit comprises:
- a differentiator for generating a derivative of the shaper output signal by differentiating the shaper output signal;
- a comparator for comparing the derivative of the shaper output signal with a second threshold, and for outputting the trigger signal in dependence of an outcome of said comparing the derivative of the shaper output signal with a second threshold.

12. The pixel according to claim 11, wherein the timing unit further comprises:
- a hysteresis signal source for generating a hysteresis signal;
- a hysteresis switch operable using the trigger signal, wherein the hysteresis switch is configured to provide the hysteresis signal to the comparator in addition to the derivative of the shaper output signal when the hysteresis switch is closed and to block the hysteresis signal from reaching the comparator when the hysteresis switch is open;
- wherein the comparator is configured for comparing the derivative of the shaper output signal with said second threshold when the hysteresis switch is open and for comparing the sum of the derivative of the shaper output signal and the hysteresis signal with said second threshold when the hysteresis switch is closed;
- wherein the hysteresis switch is configured to switch from closed to open when the trigger signal is indicative for indicating that the shaper output signal has reached a peak level.

13. The pixel according to claim 1, further comprising a current source for outputting a dark current compensation current, wherein the CSA is configured for integrating the sum of the photocurrent and the dark current compensation current.

14. The pixel according to claim 1, wherein the CSA comprises:
- an amplifier having a first input connected to the photoconductor, a second input connected to a reference signal, and an output for outputting an amplified difference between a signal received at the first input and a signal received at the second input;
- a capacitor arranged between the output of the amplifier and the first input of the amplifier; and
- a reset switch arranged in parallel to the capacitor and configured to bypass the capacitor for resetting the CSA.

15. The pixel according to claim 14, wherein the amplifier is an operational amplifier or an operational transconductance amplifier, and
- wherein a level of the reference signal corresponds to the first level.

16. The pixel according to claim 1, wherein the pixel comprises a counter for counting a number of times the CSA was reset in dependence of the determined CSA base level shift.

17. A detector comprising a plurality of pixels as defined claim 1, wherein the pixels are arranged in a matrix of rows and columns.

18. An energy-resolving photon counting system, comprising the detector as defined in claim 17, and a processor for processing an image based on counter values of the counters of the plurality of pixels.

19. The energy-resolving photon counting system according to claim 18, wherein the processor is configured for correcting the counter values of a pixel of the detector based on the number of resets performed for that pixel.

20. The energy-resolving photon counting system according to claim 19, wherein the resets include resets performed as a result of the determined CSA base level shift.

* * * * *